US009839054B2

(12) United States Patent
Moritomo et al.

(10) Patent No.: US 9,839,054 B2
(45) Date of Patent: Dec. 5, 2017

(54) COMMUNICATION APPARATUS, COMMUNICATION SYSTEM, AND METHOD FOR SETTING COMMUNICATION PARAMETERS OF THE COMMUNICATION APPARATUS

(71) Applicant: CANON KABUSHIKI KAISHA, Tokyo (JP)

(72) Inventors: Kazuo Moritomo, Kawasaki (JP); Kenichi Fujii, Katsushika-ku (JP); Tatsuhiko Sakai, Nakano-ku (JP); Mitsuhiro Watanabe, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/498,869

(22) Filed: Apr. 27, 2017

(65) Prior Publication Data
US 2017/0231017 A1 Aug. 10, 2017

Related U.S. Application Data

(63) Continuation of application No. 13/941,663, filed on Jul. 15, 2013, now Pat. No. 9,686,807, which is a
(Continued)

(30) Foreign Application Priority Data

Apr. 27, 2005 (JP) ................................. 2005-130476

(51) Int. Cl.
*H04B 5/00* (2006.01)
*H04W 72/02* (2009.01)
(Continued)

(52) U.S. Cl.
CPC ........ *H04W 76/02* (2013.01); *G06K 15/4045* (2013.01); *H04N 1/00251* (2013.01);
(Continued)

(58) Field of Classification Search
CPC ..... H04W 4/008; H04W 84/02; H04W 84/10; H04W 84/12; H04W 76/02;
(Continued)

(56) References Cited

U.S. PATENT DOCUMENTS 6,157,465 A 12/2000 Suda et al. .................... 358/407
6,477,570 B1 11/2002 Takayama et al. ........... 709/224
(Continued)

FOREIGN PATENT DOCUMENTS

EP 1 548 985 A1 6/2005
JP 2002-359623 A 12/2002
(Continued)

OTHER PUBLICATIONS

European Search Report, EP Appln. No. 06 11 3163, dated Aug. 6, 2006.
(Continued)

*Primary Examiner* — Allahyar Kasraian
(74) *Attorney, Agent, or Firm* — Fitzpatrick, Cella, Harper & Scinto

(57) ABSTRACT

A device capability attribute regarding a setting on communication parameters, and provision attribute information indicative of whether or not a communication terminal is in a state that it can provide communication parameters to another communication terminal are stored in advance. The communication terminal, where the device capability attribute has at least a provision capability of the communication parameters, is selected as a provision device. In a case where there are plural communication terminals where the device capability attribute has a communication parameter provision capability, a communication terminal where the device capability attribute has the communication parameter provision capability only is preferentially selected. In a case where the device capability attributes of respective commu-
(Continued)

nication terminals are equal, a communication terminal storing the provision attribute information indicative of the state that it can provide the communication parameters is selected as a provision device.

21 Claims, 16 Drawing Sheets

Related U.S. Application Data continuation of application No. 12/748,998, filed on Mar. 29, 2010, now Pat. No. 8,503,933, which is a continuation of application No. 11/408,042, filed on Apr. 21, 2006, now Pat. No. 7,720,477.

(51) Int. Cl.
*H04W 76/02* (2009.01)
*H04W 8/00* (2009.01)
*H04N 1/00* (2006.01)
*G06K 15/00* (2006.01)
*H04W 84/18* (2009.01)
*H04L 29/06* (2006.01)

(52) U.S. Cl.
CPC ........ *H04N 1/00278* (2013.01); *H04W 8/005* (2013.01); *H04L 63/06* (2013.01); *H04L 2209/80* (2013.01); *H04W 84/18* (2013.01)

(58) Field of Classification Search
CPC ....... H04W 76/025; H04W 8/22; H04W 8/24; H04W 28/16; H04W 28/18; H04L 69/24
USPC ................... 455/41.1–41.3; 370/338
See application file for complete search history.

(56) References Cited

U.S. PATENT DOCUMENTS

| 6,892,230 | B1 | 5/2005 | Gu et al. ....................... 709/220 |
| 2001/0029530 | A1 | 10/2001 | Naito et al. ................... 709/223 |
| 2002/0026492 | A1 | 2/2002 | Fujita ........................... 709/208 |
| 2002/0147819 | A1 | 10/2002 | Miyakoshi et al. ........... 709/228 |
| 2003/0055968 | A1 | 3/2003 | Hochmuth et al. ........... 709/226 |
| 2003/0063655 | A1 | 4/2003 | Young .............................. 375/132 |
| 2003/0096576 | A1 | 5/2003 | Salonidis ..................... 455/41.1 |
| 2004/0085981 | A1* | 5/2004 | Lee .......................... H04L 47/10 370/412 |
| 2004/0157611 | A1* | 8/2004 | Smith ...................... H01Q 1/125 455/445 |
| 2004/0174817 | A1* | 9/2004 | Jabri ................. H04L 29/06027 370/238 |
| 2005/0060419 | A1 | 3/2005 | Fujii et al. ..................... 709/230 |
| 2005/0066197 | A1 | 3/2005 | Hirata et al. .................. 713/201 |
| 2005/0075084 | A1 | 4/2005 | Salokannel et al. .......... 455/126 |
| 2005/0086273 | A1 | 4/2005 | Loebbert et al. .............. 707/204 |
| 2005/0135265 | A1 | 6/2005 | Moakley et al. ............. 370/252 |
| 2005/0148326 | A1 | 7/2005 | Nogawa et al. .............. 455/420 |
| 2005/0152294 | A1 | 7/2005 | Yu et al. ....................... 370/310 |
| 2005/0157333 | A1 | 7/2005 | Cho et al. ..................... 358/1.15 |
| 2006/0007478 | A1 | 1/2006 | Ryu et al. ..................... 358/1.15 |
| 2006/0039336 | A1 | 2/2006 | Ishimura ....................... 370/338 |
| 2006/0158518 | A1 | 7/2006 | Sakai .......................... 348/207.2 |
| 2006/0200564 | A1 | 9/2006 | Watanabe et al. ............ 709/227 |
| 2006/0206592 | A1 | 9/2006 | Fujii et al. ..................... 709/220 |
| 2006/0242304 | A1 | 10/2006 | Hirose et al. ................. 709/227 |
| 2006/0246947 | A1 | 11/2006 | Fujii et al. ..................... 455/557 |
| 2006/0268744 | A1 | 11/2006 | Sakai et al. ................... 370/254 |
| 2007/0002867 | A1 | 1/2007 | Shitano et al. ............. 370/395.5 |

FOREIGN PATENT DOCUMENTS

| JP | 2004-129042 A | 4/2004 |
| KR | 2005-0063750 | 6/2005 |
| KR | 2005-0075640 | 7/2005 |
| KR | 2006-0044346 | 5/2006 |
| WO | WO 2004-098128 A1 | 11/2004 |
| WO | WO 2005/034434 A1 | 4/2005 |

OTHER PUBLICATIONS

"Specification of the Bluetooth System, Profiles, Version 1.0 B, Service Discovery Application Profile," Specification of the Bluetooth System, Core, version 1.0 B, pp. 68-85, paragraphs 2-6, Dec. 1, 1999.

Notice of Allowance, Korean Appln. No. 9-5-2007-025768449, dated May 11, 2007.

* cited by examiner

F I G. 1
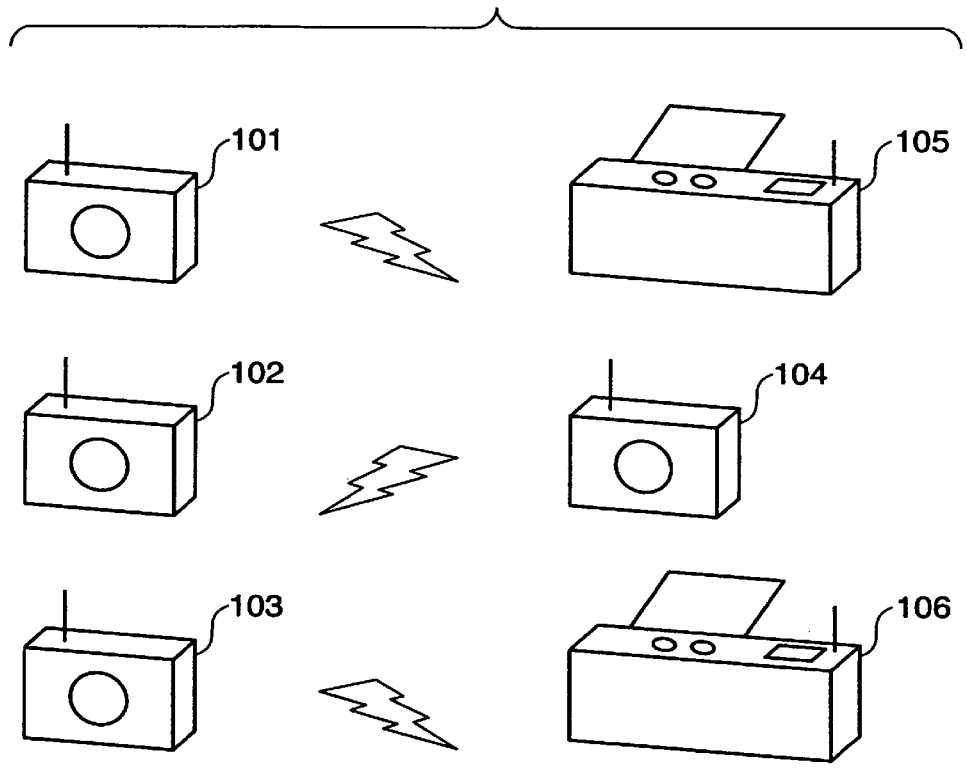

FIG. 8

| WIRELESS COMMUNICATION ITEM | DETAILS OF DATA |
|---|---|
| Network Mode | Adhoc |
| SSID | - |
| CH Number | - |
| Authentication Type | - |
| Encryption Type | WEP40 |
| Encryption Key | |
| ESSID FOR WIRELESS PARAMETER SETTING | "InitSetUp" |
| WIRELESS CH FOR WIRELESS PARAMETER SETTING | "7ch" |
| WIRELESS PARAMETER SETTING CAPABILITY ATTRIBUTE | PROVISION CAPABILITY/RECEIPT CAPABILITY |
| WIRELESS PARAMETER PROVISION ATTRIBUTE | DISENABLED |
| WIRELESS PARAMETER SETTING IDENTIFIER | 123456 |

FIG. 9

| WIRELESS COMMUNICATION ITEM | DETAILS OF DATA |
|---|---|
| Network Mode | Adhoc |
| SSID | - |
| CH Number | - |
| Authentication Type | - |
| Encryption Type | WEP40 |
| Encryption Key | |
| ESSID FOR WIRELESS PARAMETER SETTING | "InitSetUp" |
| WIRELESS CH FOR WIRELESS PARAMETER SETTING | "7ch" |
| WIRELESS PARAMETER SETTING CAPABILITY ATTRIBUTE | PROVISION CAPABILITY |
| WIRELESS PARAMETER PROVISION ATTRIBUTE | DISENABLED |
| WIRELESS PARAMETER SETTING IDENTIFIER | 123abc |

# COMMUNICATION APPARATUS, COMMUNICATION SYSTEM, AND METHOD FOR SETTING COMMUNICATION PARAMETERS OF THE COMMUNICATION APPARATUS

CROSS REFERENCE TO RELATED APPLICATION

This application is a continuation of U.S. application Ser. No. 13/941,663, filed on Jul. 15, 2013, which is a continuation of U.S. application Ser. No. 12/748,998, filed on Mar. 29, 2010, now U.S. Pat. No. 8,503,933, issued Aug. 6, 2013, which is a continuation of U.S. application Ser. No. 11/408, 042, filed on Apr. 21, 2006, now U.S. Pat. No. 7,720,477, issued May 18, 2010, each of which claims priority to Japan Patent Application No. 2005-130476, filed Apr. 27, 2005. The entire disclosures of each of those applications are hereby incorporated by reference in their entireties, as if set forth fully herein.

FIELD OF THE INVENTION

The present invention relates to a communication apparatus, a communication system, and a method for setting communication parameters of the communication apparatus.

BACKGROUND OF THE INVENTION

There is an increasing demand for changing wired data transmission to wireless data transmission. The use of wireless communication has already started in communications between a digital still camera (hereinafter referred to as a DSC) and peripheral devices such as a printer. The adoption of such wireless communication eliminates the necessity of cable installation and increases flexibility in setting locations of respective devices, thus improving portability.

In the IEEE 802.11 standard, there are two communication modes for communication between plural wireless terminals: the Infrastructure mode where communication is performed through a base station (access point, hereinafter referred to as an AP); and an Adhoc mode where wireless terminals directly communicate with each other without an intermediation of a particular AP.

Described hereinafter with reference to the drawings is, in particular, a connection method of wireless communication devices in the conventional Adhoc mode (a direct communication mode in which each device directly communicates each other without using a relay station).

FIG. 1 depicts a view showing as an example a construction of a wireless communication system where data transmission in the Adhoc mode is performed.

In FIG. 1, DSCs 101 to 104 and printers 105 and 106 respectively have a wireless communication function. In the wireless communication function, each device takes turns to generate at random a signal called "Beacon", which notifies the peripheral wireless terminals of information necessary for the wireless communication, to realize synchronization, thereby enabling data transmission between DSCs, or between a DSC and the printer 105 or 106 using wireless communication means.

FIG. 2 depicts an explanatory view of a network connection method in the Adhoc mode.

Hereinafter, a description on an Adhoc network establishing method is described, assuming that the same Adhoc wireless communication parameters are set in advance in the printer 105 and the DSC 101 shown in FIG. 1. First, the power of the wireless communication unit of the printer 105 is turned on. The printer 105 then searches for an Adhoc network that has been constructed based on Adhoc wireless parameters set in advance (S201). The search method includes: searching for a "Beacon" signal, or broadcasting a control signal called a "Probe Request" and waiting for a response to the "Probe Request," and the like. Herein, the latter method is adopted. The printer 105 broadcasts the "Probe Request" and waits for a response. In this example, an Adhoc network being searched does not exist. Therefore, even if the printer 105 transmits the "Probe Request" a predetermined number of times, the printer 105 cannot receive any "Probe Response." Therefore, the printer establishes a network by itself and starts transmitting the "Beacon" (S202).

Next, when the power of the wireless communication unit of the DSC 101 is turned on, the DSC 101 transmits, similarly to the printer 105, a "Probe Request" to search for an Adhoc network constructed based on Adhoc wireless parameters set in advance (S203). In this stage, the network being searched by the DSC 101 has already been established by the printer 105. Therefore, the DSC 101 receives a "Probe Response" from the printer 105 (S204). The DSC 101 which has received the "Probe Response" acquires synchronized information and the like of the network that has been established by the printer 105, thereby realizing connection with the network (S205).

Next, in the construction shown in FIG. 1, a conventional method of searching, by a DSC, a data-transmission target printer is described in the flowchart of FIG. 3. Described herein is an example in which a new DSC is brought in to be connected to a printer (e.g., the printer 105) in an existing Adhoc wireless LAN communication system.

Referring to FIG. 3, in a case where a DSC is connected to a printer, first, a Service Set Identifier (SSID) is set in the DSC in step S301. In step S302, an encryption key is set, as needed, to prevent tapping in wireless communication. In step S303, an Adhoc mode is set as a wireless communication mode. In step S304, a device on the wireless network is searched. In step S305, a desired printer (herein, printer 105) is selected from the devices on the wireless network and wireless communication is established between the DSC and the printer.

The above-described method enables connection between the DSC and the printer 105 through wireless communication and enables direct image data transmission from the DSC to the printer 105 for printing. In this case, some kind of method is necessary to set the setting information necessary for wireless communication in both the DSC and the printer 105. The method includes, for instance, registering in advance an SSID and an encryption key in the printer 105 or the DSC before product shipping, and connecting the DSC to the printer 105 using a USB cable to set the SSID and encryption key in the DSC. The control processing of the printer 105 in this case is shown in the flowchart of FIG. 4.

First in step S401, the printer 105 is connected to the DSC using a USB cable. In step S402, the printer 105 transmits a request command to determine whether or not the DSC comprises wireless communication means. In step S403, if the printer 105 does not receive any response from the DSC after an elapse of predetermined time period after the step S402, it determines that the DSC connected has no wireless communication means, and the control ends. If a response is received, the control proceeds to step S404 for confirming the contents of the response, and then it is determined whether or not the DSC comprises wireless communication means. If it is determined that the DSC does not comprise wireless communication means, the control ends. If it is determined that the DSC comprises wireless communication means in the step S04, the control proceeds to step S405, and the wireless communication setting information of the printer 105 is transmitted to the DSC.

The above-described method enables setting of the common setting information necessary for wireless communication in both the printer 105 and the DSC, and enables wireless communication between the printer 105 and the DSC according to the setting information. Besides, for communication means in the Adhoc mode, there is a following technique used in a network configured with a master station and a slave station. The slave station transmits a capability value of the slave station to the master station, and the master station selects a backup master as a next master station candidate based on parameters of respective slave stations. Then, backup master information, which includes an address of the selected backup master and synchronized information, is provided to the respective slave stations. According to this technique, a network can reliably be established even if the master station is gone (refer to Japanese Patent Application KOKAI No. 2004-129042).

However, according to the above-described conventional example, the following problem may occur in the method of registering an SSID and an encryption key in a printer before product shipping and connecting the printer to a DSC using a USB cable to set the SSID and encryption key in the DSC. More specifically, if a DSC is erroneously connected to the printer, contrary to user's intention the SSID and encryption key are set in the DSC in accordance with information set in the printer, overwriting the effective SSID and encryption key stored originally in the DSC.

Furthermore, another problem occurs in the method of registering an SSID and an encryption key in a DSC before product shipping and connecting the DSC to a printer using a USB cable to set the SSID and encryption key in the printer. That is, each time a DSC is connected to a printer, the printer's SSID and encryption key are changed. Moreover, the setting operation of wireless parameters is cumbersome to users.

SUMMARY OF THE INVENTION

The present invention is provided to remedy the disadvantages of the above-described conventional art.

The characteristic of the present invention is to provide a technique for simplifying a communication-related setting operation.

According to the present invention, there is provided with a communication apparatus comprising:

a storage unit configured to store a device capability attribute regarding a setting on communication parameters, and provision attribute information indicative of whether or not a terminal is in a state that it can provide communication parameters to another terminal;

an identifying unit configured to identify the device capability attribute and the provision attribute information of a target device;

a first setting unit configured to set in accordance with the provision attribute information a self device as a provision device for providing the communication parameters, in a case where it is determined based on the device capability attribute that the target device has a capability as a reception device of the communication parameters; and a second setting unit configured to set the target device as a provision device, in a case where it is determined based on the device capability attribute that the target device does not have a capability as a reception device of the communication parameters.

Further, according to the present invention, there is provided with a method of receiving communication parameters via a network from a communication terminal to set the communication parameters of a communication apparatus, the method comprising:

a step of storing in a memory a device capability attribute regarding a setting on communication parameters, and provision attribute information indicative of whether or not a terminal is in a state that it can provide communication parameters to another terminal;

a step of selecting, as a provision device, a communication terminal where the device capability attribute has at least a provision capability of the communication parameters;

in a case where there are a plurality of communication terminals where the device capability attribute has a provision capability of the communication parameters, a step of preferentially selecting, as a provision device, a communication terminal where the device capability attribute has only a provision capability of the communication parameters; and in a case where the device capability attributes of the plurality of communication terminals are equal, a step of selecting, as a provision device, a communication terminal storing the provision attribute information indicative of a state that it can provide the communication parameters.

The characteristic of the present invention is achieved by a combination of features described in independent claims. The dependent claims define further advantageous embodiments of the present invention.

Note that the summary of the invention does not list all the necessary features of the invention. Therefore, a sub-combination of these features may constitute the invention.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 depicts a view showing as an example a construction of a wireless communication system where data transmission in an Adhoc mode is performed;

FIG. 8 depicts an explanatory view of wireless parameters in a DSC that are necessary to implement the embodiment;

FIG. 9 depicts an explanatory view of wireless parameters in a printer that are necessary to implement the embodiment;

DETAILED DESCRIPTION OF PREFERRED EMBODIMENTS

Preferred embodiments of the present invention will now be described in detail in accordance with the accompanying drawings. Note that the following embodiments do not limit the invention according to the claims. Further, not all the combination of the features described in the embodiments is necessarily essential to means of solving the problem according to the present invention.

The characteristic point and object common to the following embodiments are to provide a technique of automatically setting wireless parameters in a digital still camera (DSC) serving as an image sensing apparatus (an image supply device) and in a printer serving as an output apparatus and realizing wireless connection in an Adhoc mode of the IEEE 802.11 standard.

First Embodiment

Figure 2:
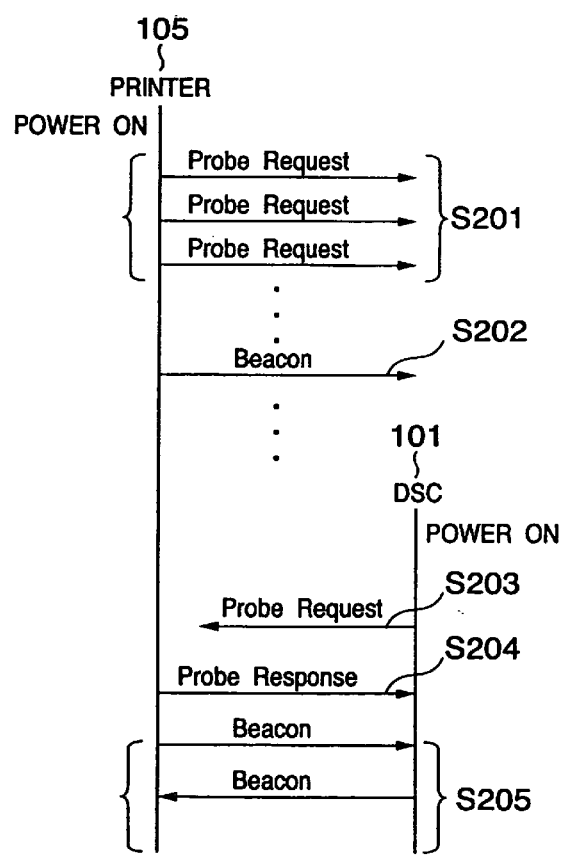
FIG. 2 depicts an explanatory view of a network connection method in the Adhoc mode.
Figure 3:
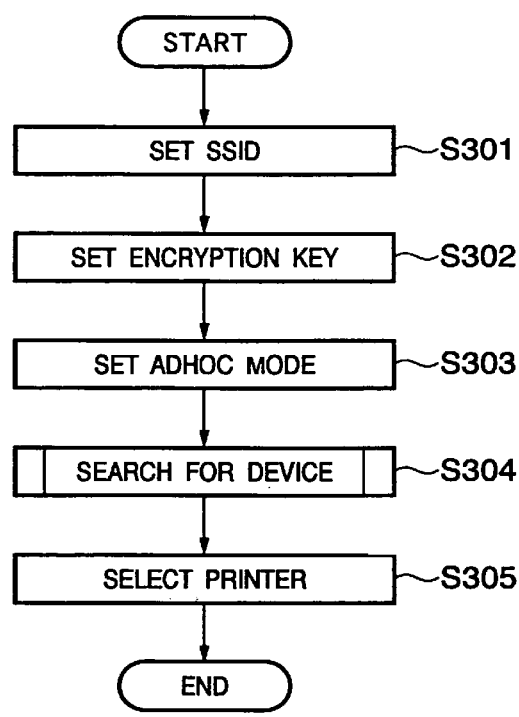
FIG. 3 is a flowchart describing a conventional search method of a data-transmission target printer from a DSC.
Figure 4:
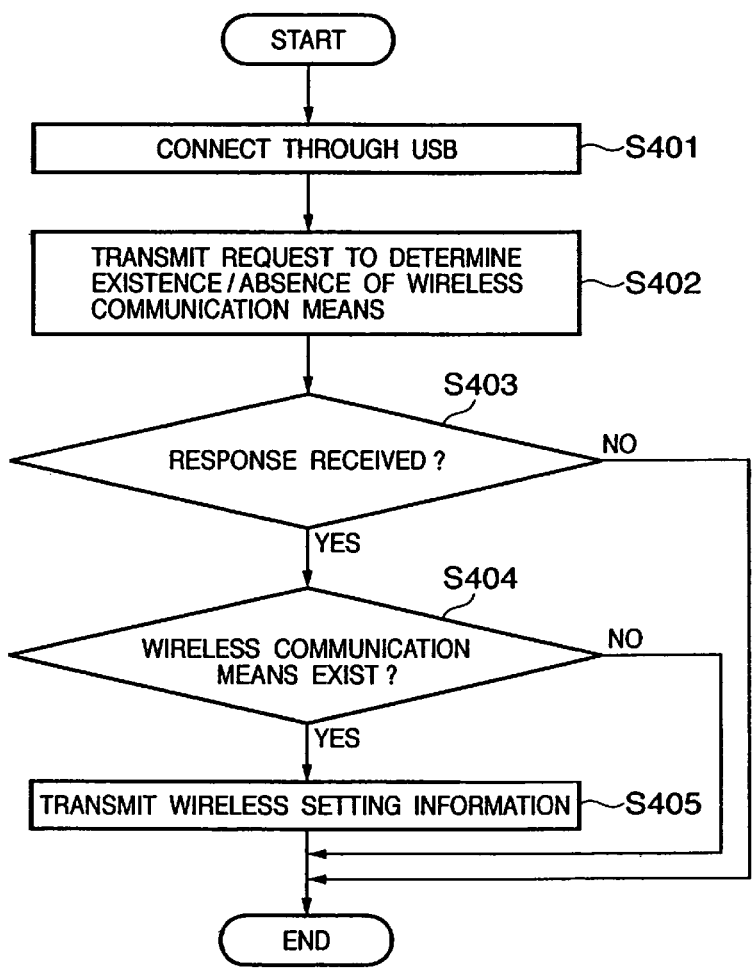
FIG. 4 is a flowchart describing control processing for setting the setting information necessary for wireless communication in both a DSC and a printer utilizing USB connection.
Figure 5:
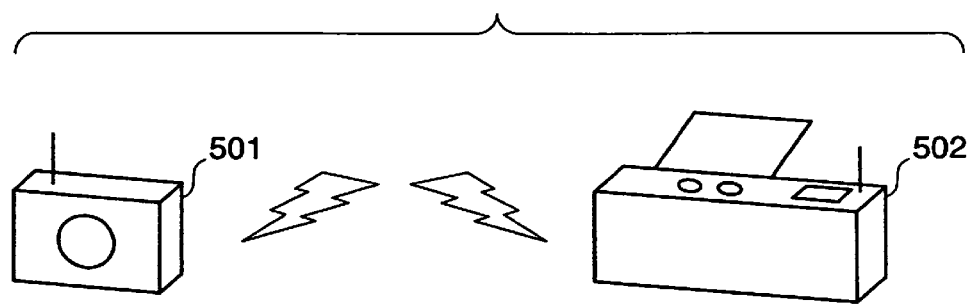
FIG. 5 depicts a view showing as an example a construction of a wireless communication system according to an embodiment of the present invention.

FIG. 5 depicts a view showing as an example a construction of a wireless communication system according to the present embodiment. Herein, wireless data transmission is realized in an Adhoc mode of the IEEE 802.11 standard.

A DSC 501, having a wireless communication unit for realizing communication in the Adhoc mode of the IEEE 802.11 standard, can perform wireless data transmission and reception with a printer, a PC and the like utilizing this function. A printer 502 also has a similar wireless communication unit. Assume in this embodiment that there is no other wireless communication apparatus near the DSC 501 and the printer 502 according to the first embodiment. Herein, image data sensed by the DSC 501 or image data stored in the DSC 501 is wirelessly transmitted to the printer 502 to be printed. Described hereinafter is an automatic setting method of wireless communication parameters (hereinafter referred to as the parameters) in the DSC 501 and the printer 502 without requiring user's complicated input operation.

Figure 6:
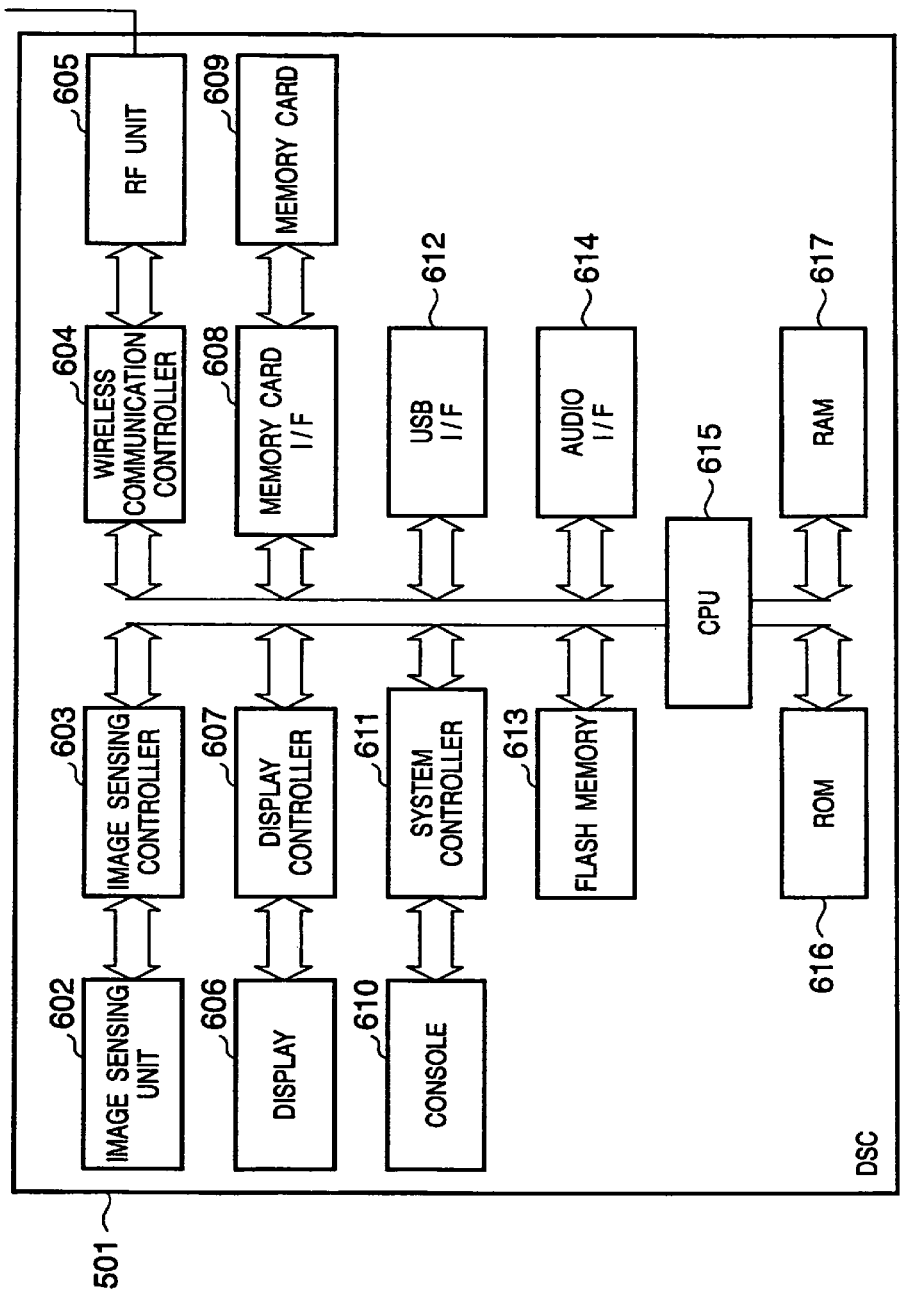
FIG. 6 is a block diagram showing a functional structure of a DSC according to the embodiment.

FIG. 6 is a block diagram showing a functional structure of the DSC according to the present embodiment. Note that this structure is common to each of the following embodiments.

A console 610 is connected to a CPU 615 via a system controller 611. Various signals generated in accordance with user's operation on the console 610 are transmitted to the CPU 615 for determining operation contents of the signals. Note that the console 610 includes various keys and a shutter switch of the DSC 501. An image sensing unit 602 has a function for photographing an image upon shutter depression. An operation of the image sensing unit 602 is controlled by an image sensing controller 603. A display 606, including a liquid crystal display and LED indicators or a speech output function, displays or outputs a message to a user. The display 606 is controlled by a display controller 607 in accordance with an instruction from the CPU 615. In accordance with information such as a menu displayed on the display 606, an operation such as user's selection of a desired operation or the like is performed in conjunction with the console 610. In other words, the display 606 and the console 610 constitute a user interface (UI) of the DSC 501. A wireless communication controller 604 performs wireless data transmission and reception. An RF unit 605 performs wireless signal transmission and reception with other wireless communication devices. A memory card interface 608 is an interface for connection of a memory card 609 that stores sensed image data. A USB interface 612 is an interface for connecting the DSC 501 with an external device through a USB cable. An audio interface 614 is an interface for transmitting/receiving audio signals to/from an external device. The above-described functional units are controlled by the CPU 615. A program executed by the CPU 615 is stored in a ROM 616 or flash memory 613. Data processed by the CPU 615 is written in or read from RAM 617 or the flash memory 613. The flash memory 613 provides a non-volatile storage area, where wireless communication setting information is stored. Note that sensed image data is subjected to well-known compression and written (stored) in the memory card 609 via the memory card interface 608.

Figure 7:
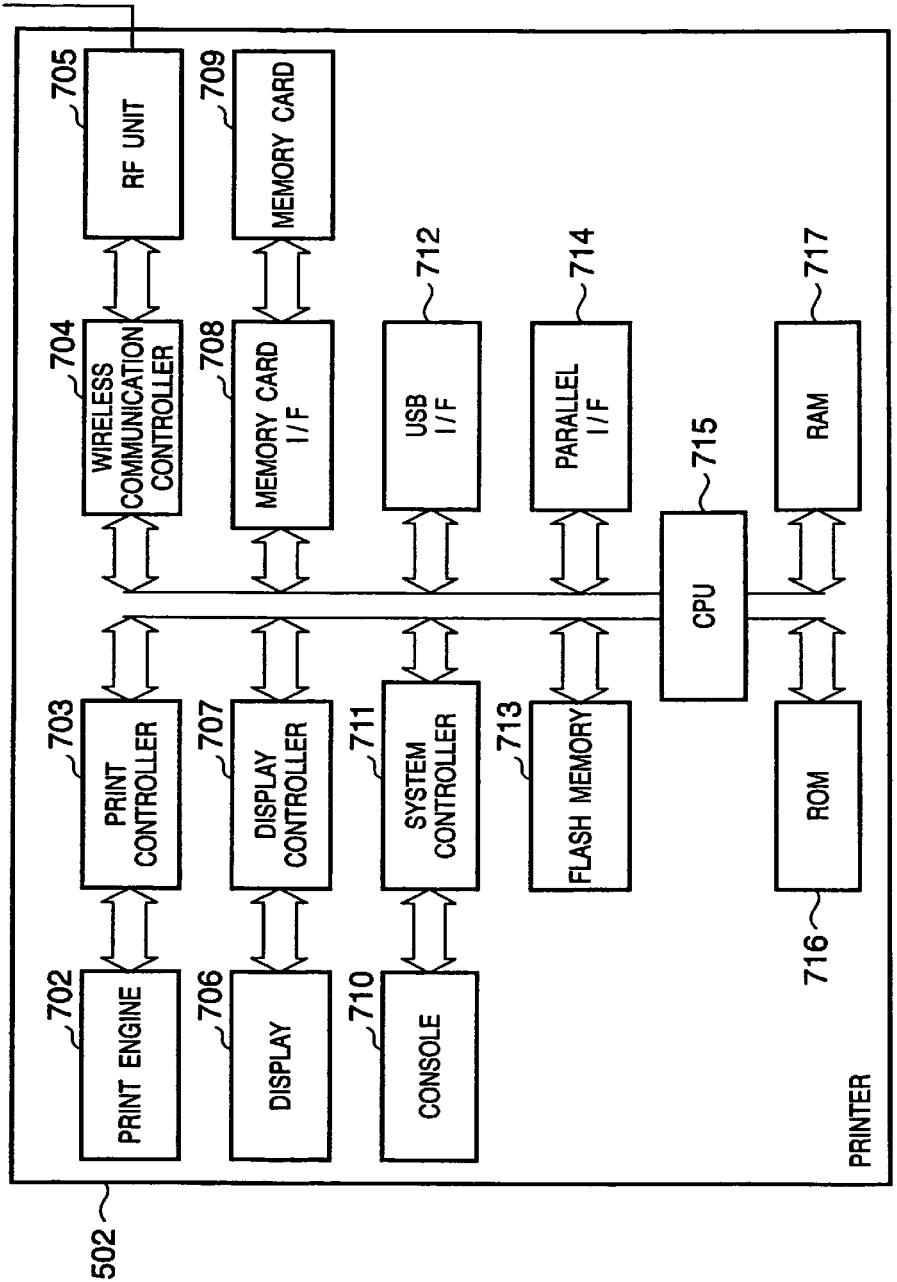
FIG. 7 is a block diagram showing a functional structure of a printer according to the embodiment.

FIG. 7 is a block diagram showing a functional structure of a printer 502 according to the present embodiment. Note that the structure of the printer is common to each of the following embodiments.

A console 710 is connected to a CPU 715 via a system controller 711. Various signals generated in accordance with user's operation on the console 710 are transmitted to the CPU 715 for determining operation contents of the signals. A print engine 702 prints images on a printing sheet based on image data. An operation of the print engine 702 is controlled by a print controller 703. A display 706, including a liquid crystal display, LED indicators or a speech output function and the like, displays or outputs various information to a user. The display 706 is controlled by a display controller 707. In accordance with information such as a menu displayed on the display 706, an operation such as user's selection of a desired item or the like is performed in cooperation with the console 710. In other words, the display 706 and the console 710 constitute a user interface (UI) of the printer 701 in this embodiment. A wireless communication controller 704 performs wireless data transmission and reception. An RF unit 705 performs wireless signal transmission and reception with other wireless communication devices. A memory card interface 708 is an interface for connection of a removable memory card 709. By inserting the memory card 609 of the DSC 501, it is possible to print image data stored in the memory card 609.

A USB interface 712 is an interface for connecting the printer 502 with an external device via a USB cable. A parallel interface 714 is an interface for connecting the printer 502 with an external device (mainly a host computer) through parallel communication. The above-described functional units are controlled by the CPU 715. A program executed by the CPU 715 is stored in a ROM 716 or flash memory 713. Data processed by the CPU 715 is written in or read from a RAM 717 or flash memory 713. The flash memory 713 provides a non-volatile storage area, where wireless communication setting information is stored.

Note that the present embodiment assumes an environment where there is no intermediation of a PC between the DSC 501 and the printer 502 as shown in FIG. 5. Therefore, wireless parameter setting in the DSC 501 and the printer 502 via a PC is not assumed herein.

FIG. 8 depicts an explanatory view of wireless parameters in the DSC 501 that are necessary to implement the present embodiment. FIG. 9 depicts an explanatory view of wireless parameters in the printer 502 that are necessary to implement the present embodiment.

The item "Network Mode" specifies the structure of the wireless network: "Infrastructure" or "Adhoc." Herein an example is given on a case where "Adhoc" is set. "SSID" indicates a network identifier. "CH Number" specifies a channel for a predetermined frequency, and is used only when a self device (self station) constitutes a network in the Adhoc. "Authentication Type" specifies an authentication method to be adopted when a network is set in the Infrastructure mode. More specifically, "Open System" or "Shared System" is selected by a user. Since the present embodiment uses the Adhoc mode, this item is unconcerned. "Encryption Type" specifies an encryption method to be adopted in a wireless network. More specifically, there are "WEP40 (40 bits)," "WEP104," "WPA-PSK" (effective only in the Infrastructure mode) and the like. One of them is automatically selected as an initial setting, or is selected by a user in a wireless device. Herein, "WEP40" is selected as an initial setting of the wireless device. "Encryption Key" specifies a key used in encryption. The key length is different depending on the encryption means. The key may automatically be generated by a wireless device, or may directly be inputted by a user. Herein assume that the wireless device automatically generates the key. Further, the following items are used in the "wireless parameter setting mode" for setting wireless parameters.

"ESSID for wireless parameter setting" is a network identifier to be adopted for establishing an Adhoc-mode wireless network in the "wireless parameter setting mode." Herein, an identifier "InitSetUp" is initially set. "Wireless CH for wireless parameter setting" similarly indicates a channel to be used in the "wireless parameter setting mode." Some value may be set as an initial setting of this parameter, or a value may randomly be generated at the point of use. Herein, "7ch" is initially set. For the "wireless parameter setting capability attribute," there are two settings: a "provision capability" in which the self device (self station) provides wireless parameters to another station (target station), and a "receipt capability" in which the self device receives wireless parameters from another station. For this parameter, both the "provision capability" and "receipt capability," or the "provision capability" alone can be set. Herein assume that the "receipt capability" alone cannot be set.

Assuming a combination of the DSC 501 and the printer 502, the printer 502 is often shared by plural DSC users. Therefore, it is not preferable to frequently change the wireless parameters of the printer 502. Moreover, there are cases that a user takes along the DSC 501 for using it not only at home but outside, and uses a printer elsewhere to print the sensed images. Therefore, a rewriting operation of wireless parameters more likely occurs in the DSC 501. In view of this, the "wireless parameter setting capability attribute" of the DSC 501 is set in the "provision capability" and "receipt capability," and the "wireless parameter setting capability attribute" of the printer 502 is set in the "provision capability" alone (FIG. 9). The "wireless parameter provision attribute" indicates whether or not the self station is connected with the Adhoc wireless network or has a record of being connected with the network, in other words, whether or not the self station has "wireless parameters" that can be provided. Herein assume that both the DSC 501 and the printer 502 do not have wireless parameters (disenabled). Although the "wireless parameter provision attribute" is "disenabled," it only means that the device does not retain wireless parameters. Therefore, it is possible to newly generate wireless parameters and provide the parameters to the receiver side. Finally, the "wireless parameter setting identifier" is a unique identifier employed in a wireless parameter setting procedure. Herein, the identifier has 48 bits (6 bytes). The identifier of the DSC 501 is "123456" (FIG. 8), and the identifier of the printer 502 is "123abc" (1 text/byte) (FIG. 9).

Figure 10:
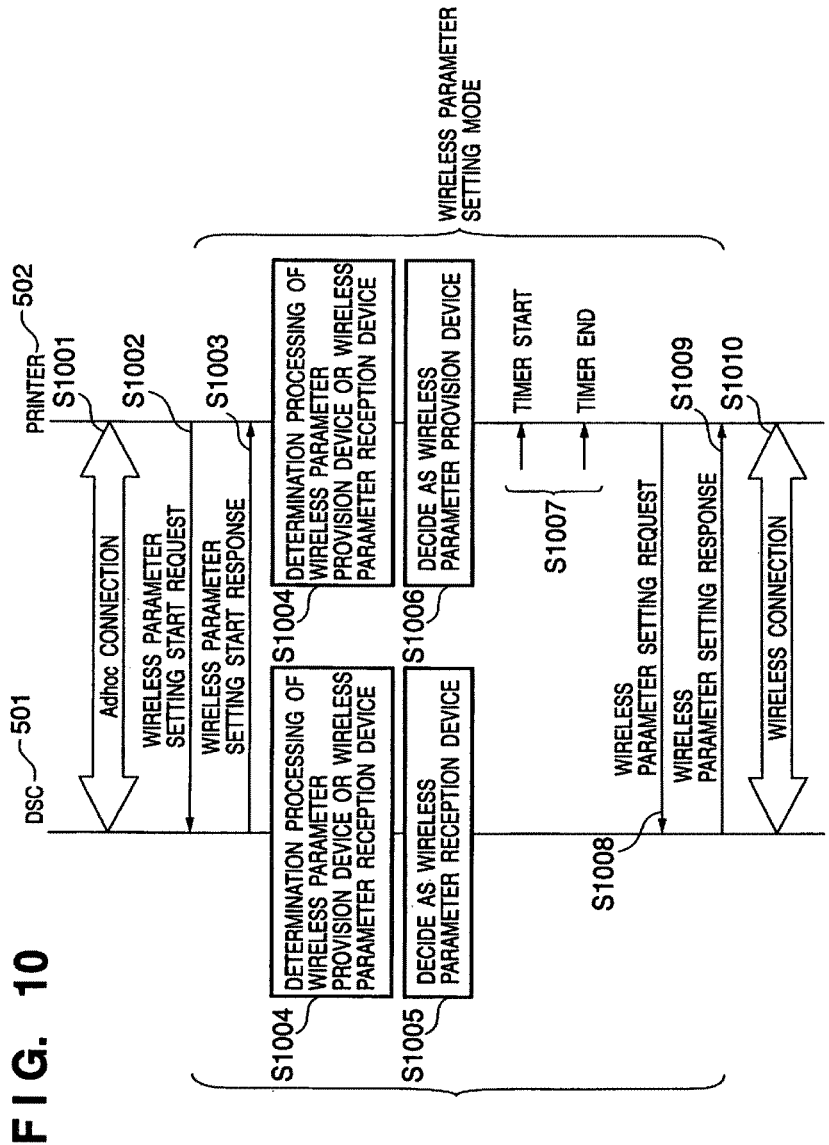
FIG. 10 depicts an explanatory view of a wireless parameter setting method in a DSC and a printer of the wireless communication system according to the embodiment.

FIG. 10 depicts an explanatory view of a wireless parameter setting method in the DSC 501 and the printer 502 of the wireless communication system according to the present embodiment. Note herein that the DSC 501 and the printer 502 store the information for setting wireless parameters shown in FIGS. 8 and 9 respectively in the flash memory (613 and 713).

The DSC 501 and the printer 502 begin the wireless parameter setting mode by, for instance, depressing a power button while depressing a reset button, or depressing a start button provided for the "wireless parameter setting mode." Based on the setting that the "ESSID for wireless parameter setting" being set in "InitSetUp" and the "wireless CH for wireless parameter setting" being set in "7ch," the DSC 501 and the printer 502 establish the wireless network connection in the Adhoc mode. Note, in the wireless connection for wireless parameter setting, encryption may be performed by storing, as wireless parameters, an encryption method (Encryption Type) for wireless parameter setting and a parameter related to encryption (Encryption Key). However, descriptions are provided on a case of not performing encryption.

Further note that the wireless parameter setting mode starting order of the device is no object. The device that has first started the wireless parameter setting operation transmits the "Beacon" including "ESSID for wireless parameter setting" to establish a network, and shifts to the wireless parameter setting mode. The device that has next started the wireless parameter setting operation transmits a "Probe Request" to the device which has transmitted the "Beacon" including "ESSID for wireless parameter setting." When a "Probe Response" is received, the device searches for a network where the "ESSID for wireless parameter setting" is set in "InitSetUp." Upon establishing the network connection, an operation mode of the device shifts to the wireless parameter setting mode. Herein assume that the DSC 501 first starts the wireless parameter setting mode, then the printer 502 starts the wireless parameter setting mode.

An operation mode of the DSC 501 shifts to the wireless parameter setting mode by the foregoing procedure, and the DSC 501 establishes the Adhoc network where the "ESSID for wireless parameter setting" is set in "InitSetUp." The printer 502; which detects the network, is connected to (incorporated into) the network and an operation mode of the printer 502 shifts to the wireless parameter setting mode (S1001). Next, in S1002, the printer 502 which is connected to the network transmits a "wireless parameter setting start request" that includes the following setting of the printer 502: the "wireless parameter setting capability attribute" being "provision capability," the "wireless parameter provision attribute" being "disenabled," and the "wireless parameter setting identifier" being "123abc." The transmission destination may be the DSC 501 alone or all devices connected to the network. Since only the DSC 501 is connected to the network in this example, the DSC 501 which has received the request stores in the flash memory 613 the setting: the "wireless parameter setting capability attribute" being "provision capability," the "wireless parameter provision attribute" being "disenabled," and the "wireless parameter setting identifier" being "123abc," along with the identifier "MAC Address" of the printer 502, unique to the network. Then, the DSC 501 transmits a "wireless parameter setting start response" that includes the following setting of the DSC 501: the "wireless parameter setting capability attribute" being "provision capability/receipt capability," the "wireless parameter provision attribute" being "disenabled," and the "wireless parameter setting identifier" being "123456" (S1003). The transmission destination is the sender of the "wireless parameter setting start request" (the printer 502 in this example). As similar to the DSC 501, the printer 502 stores in the flash memory 713 the information regarding wireless parameter setting set in the DSC 501 along with the "MAC Address" of the DSC 501.

The DSC 501 and the printer 502, which have acquired the wireless parameter setting information of one another, determine in S1004 whether or not the self station can become a "wireless parameter provision device."

Figure 11:
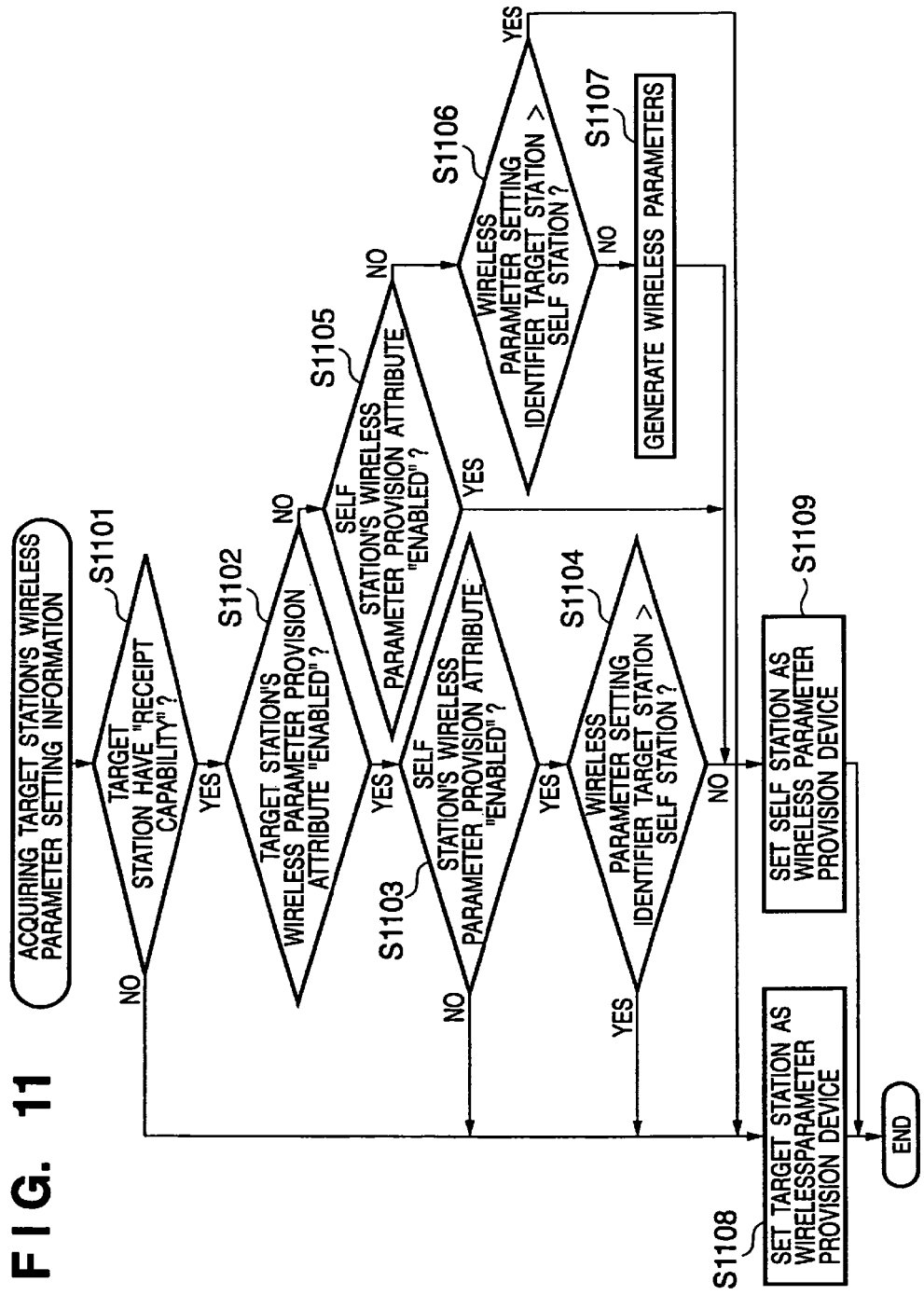
FIG. 11 is a flowchart describing determination processing (S1004) of wireless parameter setting information in a DSC according to the embodiment.

FIG. 11 is a flowchart describing the determination processing (S1004) of wireless parameter setting information in the DSC 501 according to the present embodiment. The program that executes this processing is stored in the ROM 616 (or the flash memory 613) and is executed under the control of the CPU 615.

The DSC 501, which has received from the printer 502 the wireless parameter setting information of the printer 502, confirms the "wireless parameter setting capability attribute" of the target station (herein the printer 502) in step S1101. In the example shown in FIG. 9, the "wireless parameter setting capability attribute" of the printer 502 is "provision capability"; thus the printer 502 has no "receipt capability." In this case, the control proceeds to step S1108, where the DSC 501 becomes a "wireless parameter reception device," and this setting is stored (S1005 in FIG. 10). Other control steps in FIG. 11 will be described later in the following embodiments.

Figure 12:
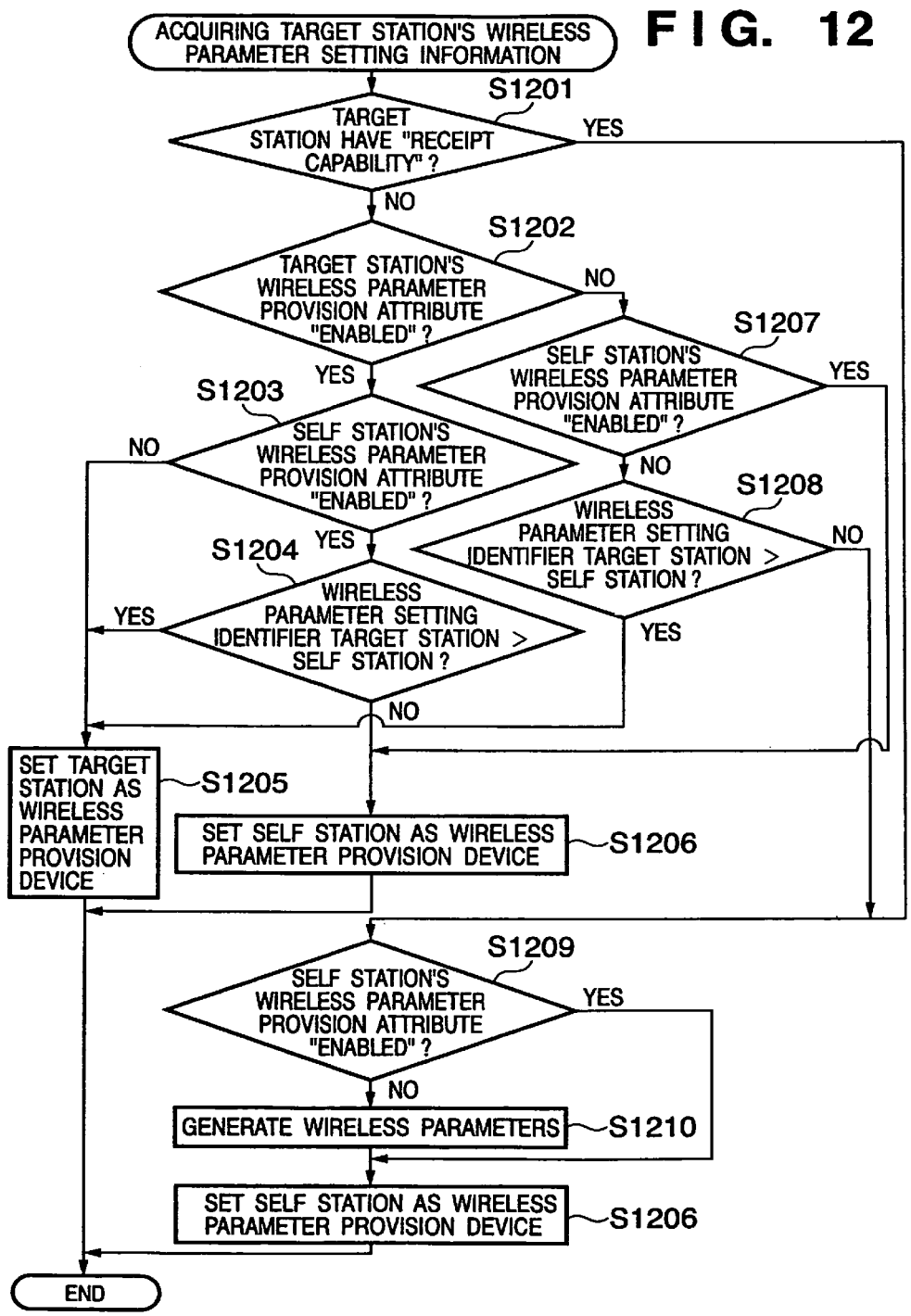
FIG. 12 is a flowchart describing determination processing of wireless parameter setting information in a printer according to the embodiment.

FIG. 12 is a flowchart describing determination processing of wireless parameter setting information in the printer 502 according to the present embodiment. The program that executes this processing is stored in the ROM 716 (or the flash memory 713) and is executed under the control of the CPU 715.

The printer 502, which has received from the DSC 501 the wireless parameter setting information of the DSC 501, confirms the "wireless parameter setting capability attribute" of the target station (herein the DSC 501) in step S1201. In this example the "wireless parameter setting capability attribute" of the DSC 501 is "provision capability/receipt capability." Since the DSC 501 has a receipt capability, the control proceeds to step S1209 to determine if the "wireless parameter provision attribute" is "enabled." If "enabled," the wireless parameters set in the self station are handled as the wireless parameters to be transmitted to the target station. However, in this case, the "wireless parameter provision attribute" of the printer 502 is "disenabled"; thus the printer 502 does not have wireless parameters. Therefore, in step S1210, the printer 502 generates wireless parameters by itself. The items to be generated are "SSID," "CH Number," and "Encryption Key" shown in FIG. 9. The "SSID" must be a text string having 32 bites or less; the "CH Number" must be a numeral in the range of 1 to 14; and the "Encryption Key" may be any text string having 5 bytes or less since the "Encryption Type" is "WEP40." According to this limitation, wireless parameters are generated. Then, the fact that the printer 502 has become a "wireless parameter provision device" is stored (S1206 in FIG. 12, S1006 in FIG. 10).

Meanwhile, in step S1201, if the "wireless parameter setting capability attribute" of the target station does not have a "receipt capability," the control proceeds to step S1202 where it is determined if the "wireless parameter provision attribute" of the target station is "enabled." If so, the control proceeds to step S1203 to determine if the "wireless parameter provision attribute" of the self station is "enabled." If it is not "enabled," the control proceeds to step S1205. If it is "enabled," the control proceeds to step S1204 for comparing the setting identifier of the self station with that of the target station. If the setting identifier of the target station is larger, the control proceeds to step S1205, and the target station is set as a wireless parameter provision device. If the setting identifier of the self station is larger, the control proceeds to step S1206, and the self station is set as a wireless parameter provision device.

In step S1202, if the "wireless parameter provision attribute" of the target station is not "enabled," the control proceeds to step S1207 to determine if the "wireless parameter provision attribute" of the self station is "enabled." If it is "enabled," the control proceeds to step S1206. If it is not "enabled," the control proceeds to step S1208 for comparing the setting identifier of the self station with that of the target station. If the setting identifier of the target station is larger, the control proceeds to step S1205, and the target station is set as a wireless parameter provision device. If the setting identifier of the self station is larger, the control proceeds to step S1209, and the aforementioned processing is executed.

The printer 502, which has become the "wireless parameter provision device," starts the timer for counting down a predetermined period (S1007 in FIG. 10), and waits for the predetermined period to respond to a "wireless parameter setting start request" from other devices in the network that may become a "wireless parameter provision device." After a lapse of predetermined period, the printer 502 decides that there is no more wireless device in the network that can transmit a "wireless parameter setting start request." The printer 502, which has become the "wireless parameter provision device," transmits a "wireless parameter setting request" including the self-generated "wireless parameters" to all devices in the network (S1008). The device (herein the DSC 501) which receives the "wireless parameter setting request" reflects the received wireless parameters to the self station, and sets the parameters in the wireless communication controller 604 of the DSC 501. When this processing is normally completed, a "wireless parameter setting response" is transmitted to the printer 502 serving as a "wireless parameter provision device" (S1009). Then, the DSC 501 and the printer 502 end the wireless parameter setting mode, and establish the network in the Adhoc mode based on the new wireless parameters for connection (S1010).

As described above, according to the first embodiment, it is possible to automatically set common wireless parameters in the DSC and the printer with a minimum user operation, and achieve wireless connection in the Adhoc mode without requiring a user operation, such as parameter input.

Second Embodiment

The foregoing first embodiment has been described in a construction of a wireless communication system comprising a DSC and a printer, capable of data transmission by wireless connection in the Adhoc mode of the IEEE 802.11 standard.

Figure 13:
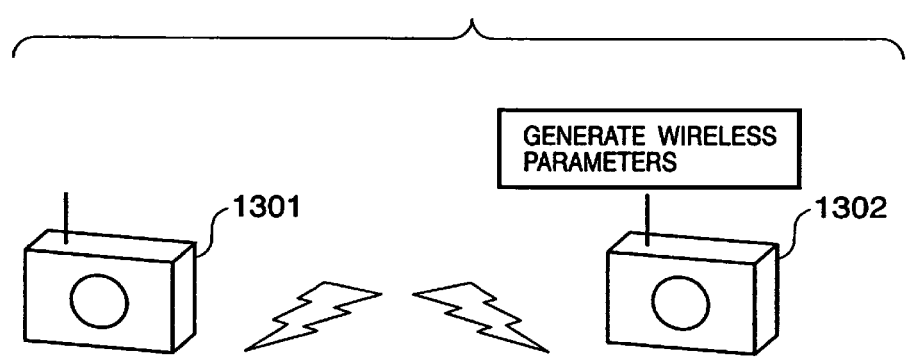
FIG. 13 depicts a view showing a construction of a wireless communication system comprising two DSCs.

The second embodiment provides a wireless communication system comprising two DSCs 1301 and 1302 as shown in FIG. 13, capable of data transmission by wireless connection in the Adhoc mode of the IEEE 802.11 standard. In this system, the two DSCs 1301 and 1302 are wirelessly connected, and image data respectively sensed by the DSCs 1301 and 1302 are transmitted wirelessly. The second embodiment also provides a method that enables automatic wireless parameter setting in the DSCs 1301 and 1302 without requiring a user's input operation. As shown in FIG. 13, assume that there are no other wireless communication terminals besides these DSCs. Since the construction of the DSC according to the second embodiment is identical to that of the first embodiment, description thereof is omitted.

Further, assume that the "wireless parameter setting capability attribute" of both DSCs 1301 and 1302 is "provision capability/receipt capability," and the "wireless parameter provision attribute" of the DSC 1301 is "enabled" while that of the DSC 1302 is "disenabled."

The wireless parameter setting method according to the second embodiment is basically the same as that described in FIG. 10. Although FIG. 10 shows communication between a DSC and a printer, the second embodiment executes communication between two DSCs.

The DSCs 1301 and 1302 start the "wireless parameter setting mode" in the similar procedure to that of FIG. 10, and acquire the wireless parameter setting information of one another to determine whether or not the self station can be a "wireless parameter provision device (S1004).

Next, the wireless parameter setting information determination processing (S1004) of the DSC 1301 according to the second embodiment is described with reference to the flowchart in FIG. 11.

The DSC 1301, which has received from the DSC 1302 the wireless parameter setting information of the DSC 1302, confirms the "wireless parameter setting capability attribute" of the target station (herein the DSC 1302) in step S1101. In this example, the "wireless parameter setting capability attribute" of the DSC 1302 is "provision capability/receipt capability"; thus, the DSC 1302 has a receipt capability. Since it is impossible to make determination based only on this item, the control proceeds to step S1102 where the DSC 1301 confirms the "wireless parameter provision attribute" of the target station (DSC 1302). Since the "wireless parameter provision attribute" of the DSC 1302 is "disenabled," the control proceeds to step S1105 and the DSC 1301 confirms if the "wireless parameter provision attribute" of the self station (DSC 1301) is "enabled." Since the "wireless parameter provision attribute" of the DSC 1301 is "enabled," the control proceeds to step S1109. Then, the wireless parameters set in the self station (DSC 1301) are handled as the wireless parameters to be transmitted to the target station (DSC 1302), and the fact that the DSC 1301 has become a "wireless parameter provision device" is stored.

Further, the wireless parameter setting information determination processing of the aforementioned target station (herein self station) (DSC 1302) is described with reference to FIG. 11.

The DSC 1302 (self station), which has received from the DSC 1301 the wireless parameter setting information of the DSC 1301 (target station), confirms the "wireless parameter setting capability attribute" of the target station (herein DSC 1301) in step S1101. In this example, the "wireless parameter setting capability attribute" of the target station (DSC 1301) is "provision capability/receipt capability"; thus, the DSC 1301 has a receipt capability. The control proceeds to step S1102 where the DSC 1302 (self station) confirms the "wireless parameter provision attribute" of the DSC 1301 (target station). Since the "wireless parameter provision attribute" of the target station (DSC 1301) is "enabled" and that of the self station (DSC 1302) is "disenabled," the control proceeds to step S1108. Then, the fact that the self station (DSC 1302) has become the "wireless parameter reception device" is stored.

Thereafter, wireless parameters are transmitted from the "wireless parameter provision device" (DSC 1301) to the "wireless parameter reception device" (DSC 1302) for wireless communication parameter setting. Since the method of realizing the Adhoc wireless connection is identical to that of the first embodiment, description thereof is omitted.

Third Embodiment

The foregoing second embodiment has described a construction of a wireless communication system comprising two DSCs, capable of data transmission by wireless connection in the Adhoc mode of the IEEE 802.11 standard. While in the second embodiment the "wireless parameter setting capability attribute" is set in "provision capability/ receipt capability" and the "wireless parameter provision attribute" of the DSC 1301 is "enabled" and that of the DSC 1302 is "disenabled," the third embodiment describes a case where the "wireless parameter provision attribute" of the two DSCs is "enabled." Assume that the "wireless parameter setting identifier" of the DSC 1301 is "123456" and that of the DSC 1302 is "456789."

The wireless parameter setting method according to the third embodiment is described with reference to FIG. 10. Although FIG. 10 shows communication between a DSC and a printer, the third embodiment executes communication between two DSCs as similar to the second embodiment. The construction of the DSC according to the third embodiment is similar to that of the first embodiment.

Referring to FIG. 10, the DSCs 1301 and 1302 start the "wireless parameter setting mode" in the similar procedure to that of FIG. 10, and acquire the wireless parameter setting information of one another to determine whether or not the self station can be a "wireless parameter provision device (S1004).

Next, the wireless parameter setting information determination processing (S1004) of the DSC 1301 according to the third embodiment is described with reference to the flowchart in FIG. 11.

The self station (DSC 1301), which has received from the target station (DSC 1302) the wireless parameter setting information of the DSC 1302, confirms the "wireless parameter setting capability attribute" of the target station (the DSC 1302) in step S1101. The "wireless parameter setting capability attribute" of the DSC 1302 is "provision capability/receipt capability"; thus, the DSC 1302 has a receipt capability. Since it is impossible to make determination based only on this item, the control proceeds to step S1102 where the DSC 1301 confirms the "wireless parameter provision attribute" of the target station (DSC 1302). Since the "wireless parameter provision attribute" of the DSC 1302 is "enabled," the control proceeds to step S1103. Since the "wireless parameter provision attribute" of the DSC 1301 is "enabled," it is impossible to make determination based on this item. Therefore, the control proceeds to step S1104 for comparing the "wireless parameter setting identifier" ("456789") of the target station (DSC 1302) with the "wireless parameter setting identifier" ("123456") of the self station (DSC 1301). In this example, since the wireless parameter setting identifier of the DSC 1301 is smaller, the control proceeds to step S1108. The DSC 1301 determines that the target station is the provision device and the self station is the "wireless parameter reception device." Then, the fact that the DSC 1301 has become a "wireless parameter reception device" is stored (S1006).

Meanwhile, in step S1102, if the "wireless parameter provision attribute" of the target station (DSC 1302) is not "enabled," the control proceeds to step S1105 to determine if the "wireless parameter provision attribute" of the self station (DSC 1301) is "enabled." If it is not "enabled," the control proceeds to step S1106 for comparing the "wireless parameter setting identifier" ("456789") of the target station (DSC 1302) with the "wireless parameter setting identifier" ("123456") of the self station (DSC 1301). In this example, since the identifier of the target station is larger, the control proceeds to step S1108. The DSC 1301 decides that the target station is the provision device and the self station is the "wireless parameter reception device." Then, the fact that the DSC 1301 has become a "wireless parameter reception device" is stored (S1006). However, in step S1106, if the "wireless parameter setting identifier" of the self station (DSC 1301) is larger than that of the target station (DSC 1302), wireless parameters are generated in step S1107. Then in step S1109, the self station (DSC 1301) is stored as a wireless parameter provision device.

Further, the wireless parameter setting information determination processing of the target station (DSC 1302) according to the third embodiment is described with reference to the flowchart in FIG. 11. Note since the following description provides processing performed by the DSC 1302, the DSC 1302 is referred to as a self station and the DSC 1301 is referred to as a target station.

The self station (DSC 1302), which has received from the target station (DSC 1301) the wireless parameter setting information of the DSC 1301, confirms the "wireless parameter setting capability attribute" of the target station (DSC 1301) in step S1101. In this example, the "wireless parameter setting capability attribute" of the target station (DSC 1301) is "provision capability/receipt capability"; thus, the DSC 1301 has a receipt capability. Since it is impossible to make determination based only on this item, the control proceeds to step S1102 where the DSC 1302 confirms the "wireless parameter provision attribute" of the target station (DSC 1301). Since the "wireless parameter provision attribute" of the target station (DSC 1301) is "enabled", the control proceeds to step S1103 to determine if the "wireless parameter provision attribute" of the DSC 1302 is "enabled." Since it is "enabled" and it is impossible to make determination based on this item, the control proceeds to step S1104 for comparing the "wireless parameter setting identifier" ("123456") of the target station (DSC 1301) with the "wireless parameter setting identifier" ("456789") of the self station. In this example, since the wireless parameter setting identifier of the self station (DSC 1302) is larger, the control proceeds to step S1109. The DSC 1302 determines that the self station is the "wireless parameter provision device." Since the "wireless parameter provision attribute" of the DSC 1302 is "enabled," the wireless parameters set in the self station (DSC 1302) are handled as the wireless parameters to be transmitted to the other device. Then, the fact that the self station has become a "wireless parameter provision device" is stored (S1006 in FIG. 10).

In the third embodiment, the "wireless parameter setting capability attribute" of the two devices is both set in "provision capability/receipt capability." Also in a case where the "wireless parameter setting capability attribute" is both set in "provision capability," the similar procedure is performed.

Moreover, in the third embodiment, the "wireless parameter provision attribute" of the two devices is both "enabled." Also in a case where the "wireless parameter provision attribute" is both "disenabled," similar steps are taken for determining the "wireless parameter provision device." The "wireless parameter" generation means (S1107 in FIG. 11) provided by the "wireless parameter provision device" is similar to the first embodiment.

The method of transmitting the wireless parameters from the "wireless parameter provision device" to the "wireless parameter reception device" and realizing the Adhoc wireless connection thereafter is similar to that of the first embodiment. Therefore, description thereof is omitted.

Fourth Embodiment

The foregoing embodiments have described a wireless communication system capable of data transmission by one-on-one wireless connection in the Adhoc mode of the IEEE 802.11 standard.

Figure 14:
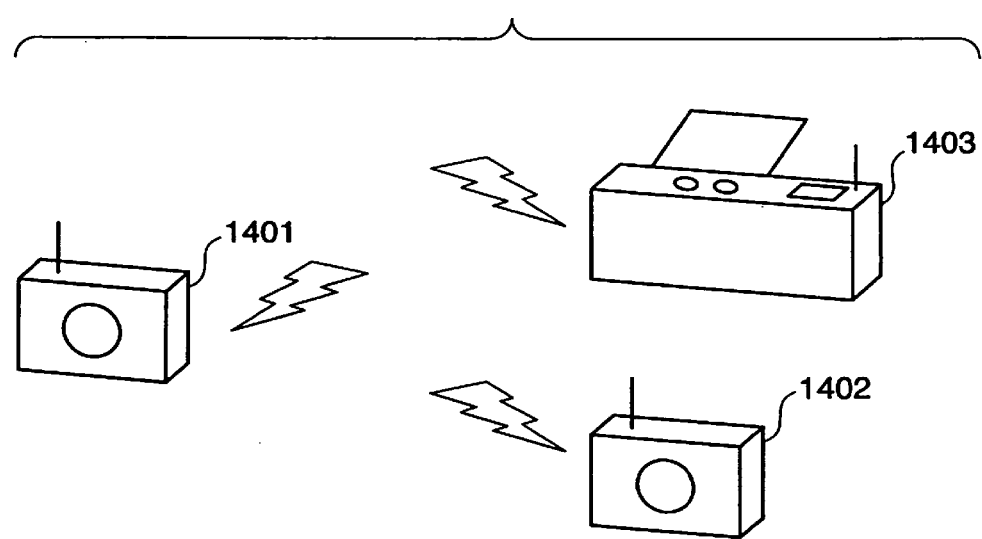
FIG. 14 depicts an explanatory view showing a construction of a wireless communication system comprising two DSCs and a printer.

The fourth embodiment provides a wireless communication system comprising three or more devices as shown in FIG. 14, capable of data transmission by wireless connection in the Adhoc mode of the IEEE 802.11 standard.

FIG. 14 depicts an explanatory view showing a construction of a wireless communication system comprising DSCs 1401 and 1402 as well as a printer 1403, capable of data transmission by wireless connection in the Adhoc mode of the IEEE 802.11 standard.

The following items are used in the "wireless parameter setting mode" for setting wireless parameters of respective devices. First, the "wireless parameter setting capability attribute" of the DSC 1401 is "provision capability/receipt capability," the "wireless parameter provision attribute" of the DSC 1401 is "enabled," and the "wireless parameter setting identifier" of the DSC 1401 is "123456." The "wireless parameter setting capability attribute" of the DSC 1402 is "provision capability/receipt capability," the "wireless parameter provision attribute" of the DSC 1402 is "disenabled," and the "wireless parameter setting identifier" of the DSC 1402 is "456789." The "wireless parameter setting capability attribute" of the printer 1403 is "provision capability," the "wireless parameter provision attribute" of the printer 1403 is "disenabled," and the "wireless parameter setting identifier" of the printer 1403 is "abcdef."

In this construction, assume that the starting order of the wireless parameter setting mode is the DSC 1401, the DSC 1402, and the printer 1403. Hereinafter, the sequence shown in FIG. 15 is described.

Figure 15:
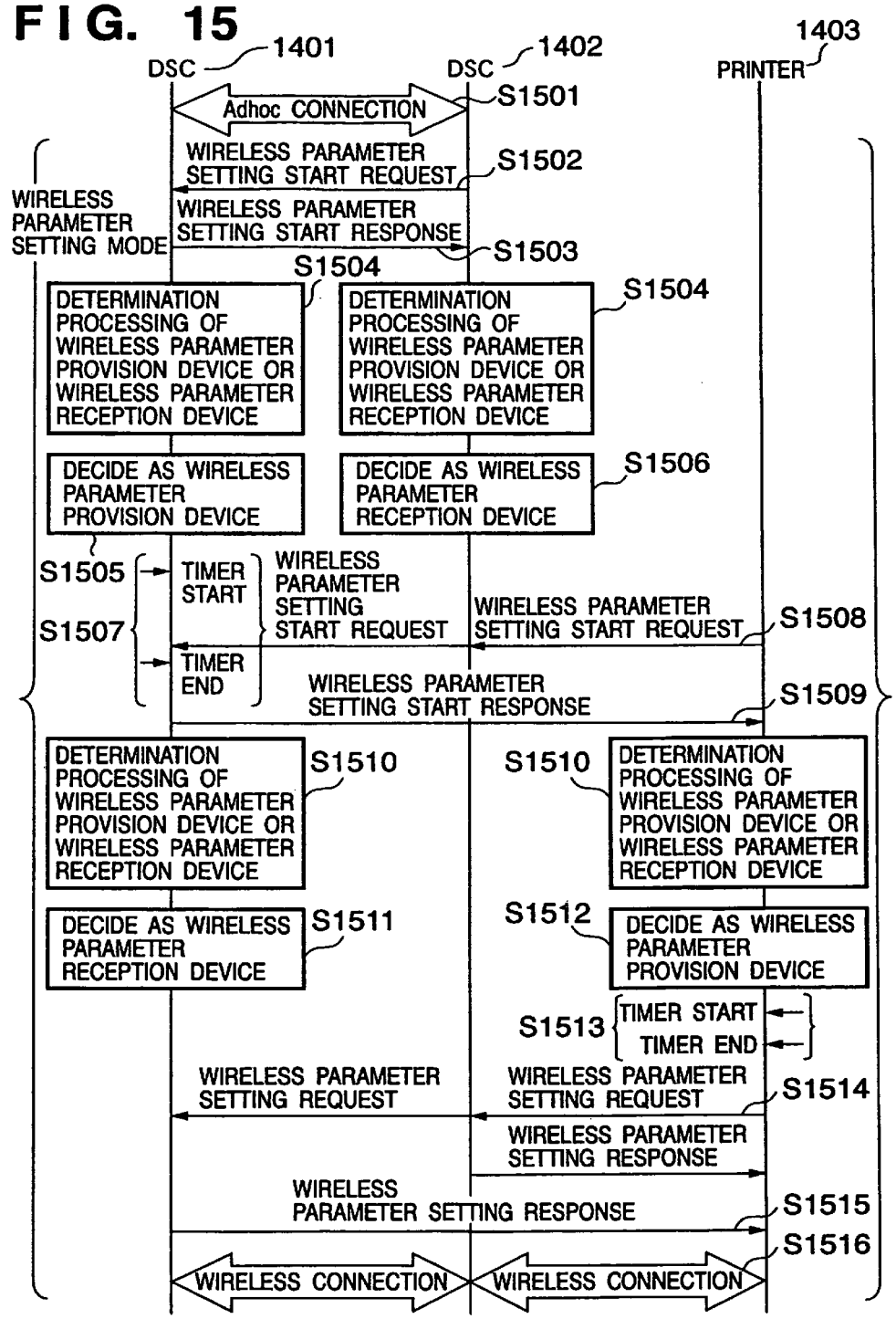
FIG. 15 depicts an explanatory view of a wireless parameter setting method in a DSC and a printer of a wireless communication system (FIG. 14) according to the fourth embodiment of the present invention.

FIG. 15 depicts an explanatory view of a wireless parameter setting method in the DSCs 1401 and 1402 as well as the printer 1403 of the wireless communication system (FIG. 14) according to the fourth embodiment.

According to the procedure similar to that of the above-described first and second embodiments, in the DSC 1401 and the DSC 1402, the DSC 1401 becomes a "wireless parameter provision device" while the DSC 1402 becomes a "wireless parameter reception device" (S1501 to S1507). The steps S1501 to S1507 in FIG. 15 are similar to S1001 to S1007 in FIG. 10. The printer 1403, which then starts the wireless parameter setting mode after start of the timer counting of the DSC 1401, transmits a "wireless parameter setting start request" (S1508).

Since the DSC 1402 is a "wireless parameter reception device," it does not respond. The DSC 1401 stops counting of the timer which is in operation (S1507), and transmits a "wireless parameter setting start response" to the printer 1403 (S1509). Thereafter, processing similar to that of the first embodiment (FIG. 10) is performed to determine a "wireless parameter provision device" between the DSC 1401 and the printer 1403. As a result, the printer 1403 becomes the "wireless parameter provision device" while the DSC 1401 becomes the "wireless parameter reception device" (S1510 to S1513). The printer 1403, which has become the "wireless parameter provision device," transmits a "wireless parameter setting request" to all devices in the network (S1514).

The devices (herein the DSCs 1401 and 1402) which receive the "wireless parameter setting request" reflect the received wireless parameters to the self station, and set the parameters in the wireless communication controller 604. When this processing is normally completed, the DSCs 1401 and 1402 respectively transmit a "wireless parameter setting response" to the printer 1403 serving as a "wireless parameter provision device" (S1515). In this manner, the DSCs 1401, 1402, and the printer 1403 can perform communication in the Adhoc mode (S1516). Since the method of the Adhoc wireless connection is similar to that of the first embodiment, description thereof is omitted.

As described above, according to the fourth embodiment, even in a case where there are three or more wireless communication devices including a DSC and a printer in the network, it is possible to automatically set wireless parameters in the DSC and the printer with a minimum user operation, and achieve wireless connection in the Adhoc mode without requiring a user operation, such as parameter input.

Fifth Embodiment

The foregoing third embodiment has described a wireless communication system comprising two DSCs 1301 and 1302 whose settings are as follows: both of their "wireless parameter setting capability attributes" are "provision capability/receipt capability," both of their "wireless parameter provision attributes" are "enabled," and the "wireless parameter setting identifiers" are different for each of the DSCs. In the case of the above-described embodiment, there was no problem even if a user does not know which DSC's wireless parameters are set automatically.

In comparison, the fifth embodiment describes a method of setting wireless parameters of a user-intended DSC (objective DSC) in another DSC. Assume that the items used in the "wireless parameter setting mode" of respective devices are identical to those of the third embodiment. The following description is provided on a case where the wireless parameters of the DSC 1302 are set in the DSC 1301.

First, the wireless parameter setting capability attribute of the DSC 1302 is set in the "provision capability." To set it, for instance, a "manual mode" is provided in the "wireless parameter setting mode" so that a user can arbitrarily set the "wireless parameter provision device" or the "wireless parameter reception device." More specifically, the input/output functions such as the console 610 and the display 606 of the DSC 1302 are used for selecting the "manual setting mode" and setting the self station for "operating as a wireless parameter provision device." By this operation, "operating only as a wireless parameter provision device" is set as the "wireless parameter setting capability attribute" of the DSC 1302.

Next, the DSC 1301 is similarly set in a way that it only operates as a wireless parameter reception device. By this operation, "operating only as a wireless parameter reception device" is set as the "wireless parameter setting capability attribute" of the DSC 1301. Then, the similar processing to that of the first embodiment is performed to start the "wireless parameter setting mode" in the DSCs 1301 and 1302. The DSCs 1301 and 1302 acquire the wireless parameter setting information of one another to determine whether or not the self station can become a "wireless parameter provision device."

Figure 16:
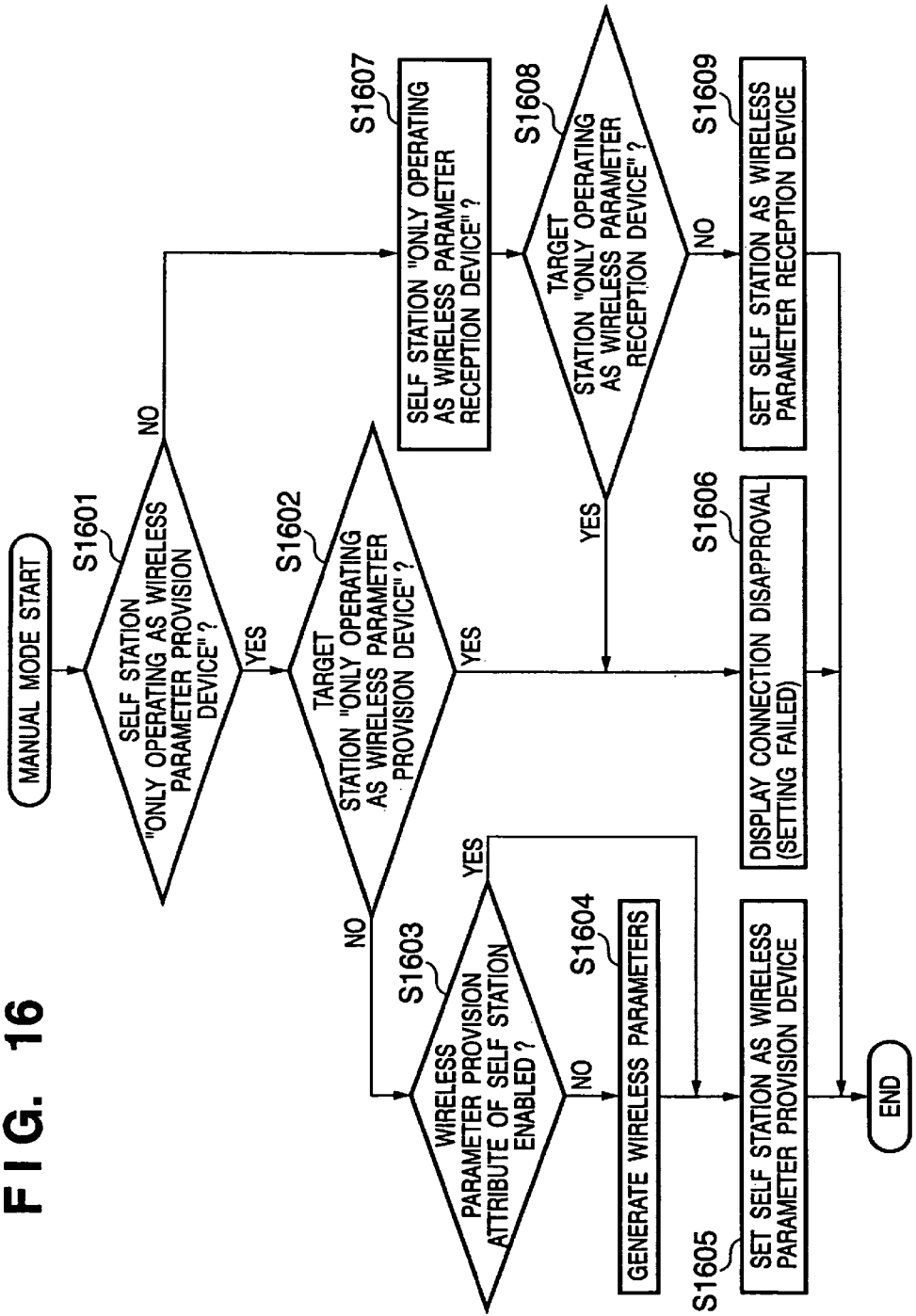
FIG. 16 is a flowchart describing determination processing of a wireless parameter provision device in a DSC of a communication system according to the fifth embodiment of the present invention.

FIG. 16 is a flowchart describing determination processing of a wireless parameter provision device in the DSC of the communication system according to the fifth embodiment. Assume herein that the "wireless parameter setting capability attribute" of the DSC 1301 is set in "operating only as a wireless parameter reception device," and the "wireless parameter setting capability attribute" of the DSC 1302 is set in "operating only as a wireless parameter provision device."

In the case of DSC 1301, the determination in step S1601 for "whether or not the self station operates only as a provision device" results in NO. Then the process proceeds to step S1607, the self station is decided as "operating only as a wireless parameter reception device." Next, in step S1608, since the target station (DSC 1302) is a device which is "operating only as a wireless parameter provision device," the determination results in NO and the process proceeds to step S1609. In the step S1609, the DSC 1301 (self station) is set as a "wireless parameter reception device" and the setting is stored. Then, the control ends.

In the case of DSC 1302, the determination in step S1601 for "whether or not the self station operates only as a provision device" results in YES. The process proceeds to step S1602, and it is determined whether or not the target station (DSC 1301) "operates only as a wireless parameter provision device." Since the determination results in NO, the control proceeds to step S1603 for determining whether or not the wireless parameter provision attribute of the self station is enabled. If YES, the control proceeds to step S1605 and the self station is set as a wireless parameter provision device which transmits the stored wireless parameters to the target station, and the setting is stored. Meanwhile, in step S1603, if the wireless parameter provision attribute of the self station (DSC 1302) is not enabled, the control proceeds to step S1604 where the self station (DSC 1302) generates the wireless parameters. In step S1605, the fact that the self station is a provision device for transmitting the generated parameters to the target station is stored and transmitted.

If, for instance, the "wireless parameter setting capability attributes" of both the DSCs 1301 and 1302 are "operating only as a wireless parameter provision device," the control proceeds from step S1602 to S1606. Meanwhile, if the "wireless parameter setting capability attribute" of the target station is "operating only as a wireless parameter reception device," the control proceeds from step S1608 to S1606. In step S1606, the connection is disapproved (setting failed), and the connection disapproval is notified to the user.

The DSC 1301 which has become the "wireless parameter reception device" in the foregoing manner stands by for a "wireless parameter setting request." Meanwhile, the DSC 1302 which has become the "wireless parameter provision device" transmits a "wireless parameter setting request" to the DSC 1301. The DSC 1301 which receives the "wireless parameter setting request" reflects the received wireless parameters to the self station (DSC 1301), and performs setting on the wireless communication controller 604 of the DSC 1301. When this processing is normally completed, the DSC 1301 transmits a "wireless parameter setting response" to the DSC 1302 serving as a "wireless parameter provision device." Since the method of establishing the Adhoc wireless connection thereafter is identical to that of the first embodiment, description thereof is omitted.

As described above, according to the fifth embodiment, it is possible to perform automatic wireless parameter setting with a minimum user operation in a communication-target device (target station) based on a user's intended device without requiring a user operation, such as parameter input. According to the wireless communication parameters set in this manner, wireless communication in the Adhoc mode is realized.

Note although the fifth embodiment has described a case of wireless communication between two DSCs, it is also possible in a wireless communication system comprising a printer and a DSC to reflect wireless parameters of the DSC to the printer.

Sixth Embodiment

The fifth embodiment has described a case where wireless parameters of a user's intended DSC are set in another DSC. This is realized by designating one of the devices to operate as a "wireless parameter provision device," and designating the other device to operate as a "wireless parameter reception device."

In comparison, the sixth embodiment describes a method of reflecting a user's designation to one of the devices only. The system construction is similar to that of the third and fifth embodiments. Assume that the items used in the "wireless parameter setting mode" of respective devices are identical to those of the third embodiment. Also assume that the wireless parameters of the DSC 1302 are set in the DSC 1301 in the wireless communication system shown in FIG. 13.

First, the input/output functions such as the console 610 and the display 606 of the DSC 1302 are used for selecting the "manual setting mode," then further setting "preferentially selecting the self station as a wireless parameter provision device." To describe this operation more specifically, "FFFFFF" is set for the "wireless parameter setting identifier." In the DSC 1301, no specific operation is performed.

Then, the similar processing to that of the first embodiment is performed to start the "wireless parameter setting mode" in the DSCs 1301 and 1302. The DSCs 1301 and 1302 acquire the wireless parameter setting information of one another to determine whether or not the self station can become a "wireless parameter provision device." Thereafter the similar processing to that of the third embodiment is performed.

Referring to the flowchart in FIG. 11, in the case of the DSC 1301, since the target station (DSC 1302) is preferentially selected as a wireless parameter provision device, the determination in step S1101 results in NO and the control proceeds to step S1108. In step S1108, the target station (DSC 1302) is set as a parameter provision device.

Meanwhile, in the case of the DSC 1302, since the target station (DSC 1301) is a wireless parameter reception device, the determination in step S1101 results in YES and the control proceeds to step S1102. If the wireless parameter provision attribute of the target station (DSC 1301) is "enabled," the control proceeds to step S1103. Since the wireless parameter provision attribute of the self station (DSC 1302) is "enabled," the control proceeds to step S1104. In step S1104, the wireless parameter identifier of the target station (DSC 1301) is compared with the wireless parameter identifier (FFFFFF) of the self station (DSC 1302). In this case, since the wireless parameter identifier (FFFFFF) of the self station (DSC 1302) is apparently larger, the control proceeds to step S1109. The self station (DSC 1302) is set as a wireless parameter provision device.

According to the determination made based on the "wireless parameter setting identifiers" in the foregoing manner, the DSC 1302 becomes the wireless parameter provision device while the DSC 1301 becomes the wireless parameter reception device.

The DSC 1301 which has become the "wireless parameter reception device" stands by for a "wireless parameter setting request." The DSC 1302 which has become the "wireless parameter provision device" transmits a "wireless parameter setting request" to the DSC 1301. The DSC 1301 which receives the "wireless parameter setting request" reflects the received wireless parameters to the self station (DSC 1301), and performs setting on the wireless communication controller 604 of the DSC 1301. When this processing is normally completed, the DSC 1301 transmits a "wireless parameter setting response" to the DSC 1302 serving as a "wireless parameter provision device." The method of establishing the Adhoc wireless connection is identical to that of the first embodiment.

As described above, according to the sixth embodiment, it is possible to perform automatic wireless parameter setting with a minimum user operation in a communication-target station based on a user's intended device without requiring a user operation, such as parameter input. In this manner, wireless communication in the Adhoc mode is realized.

The means described in the sixth embodiment is particularly effective in a case where the communication-target station is not fully equipped with input/output means.

Other Embodiments

Although preferred embodiments of the present invention are provided above, the present invention may be applied to a system constituted by a plurality of devices, or a stand-alone apparatus.

Note, the present invention can also be achieved by directly or remotely providing a software program, which realizes the above-described functions of the embodiments, to a computer system or apparatus, then reading the supplied program by a computer of the system or apparatus, and executing the program. In this case, as long as it functions as a program, the form is not limited to a program.

Therefore, to realize the functions of the present invention by a computer, the program codes themselves installed in the computer also constitute the invention. In other words, the claims of the present invention include a computer program itself for realizing the functions of the present invention. In this case, as long as it functions as a program, the form of program may be of object codes, a program executed by an interpreter, script data supplied to an OS, or the like.

Various media can be used as a recording medium for supplying a program. For instance, a Floppy®disk, a hard disk, an optical disk, a magneto-optical disk, MO, CD-ROM, CD-R, CD-RW, a magnetic tape, a non-volatile memory card, ROM, DVD (DVD-ROM, DVD-R) and the like can be used.

Furthermore, for a program supplying method, a program can be supplied by accessing a home page of the Internet using a browser of a client computer and downloading a program from the home page to a recording medium such as a hard disk. In this case, the downloaded program may be of a computer program according to the present invention, or a compressed file including an automatic installer. Moreover, the program codes constituting the program according to the present invention may be divided into plural files, and each of the plural files may be downloaded from different home pages. In other words, the claims of the present invention also include a WWW server which allows plural users to download the program file that realizes the functions of the present invention using a computer.

Still further, the program according to the present invention may be encrypted and stored in a storage medium, e.g., CD-ROM, for user distribution. In this case, a user who satisfies a predetermined condition is allowed to download key data for decryption from a homepage on the Internet, and the encrypted program is installed in a computer in an executable form using the key data.

Still further, besides aforesaid functions according to the above embodiments are realized by executing the program read by a computer, the present invention can be realized in other forms. For instance, the functions according to the above embodiments can be realized by an OS (operating system) or the like working on the computer that performs part or the entire processes in accordance with designations of the program.

Furthermore, the program read from the recording medium may be written in a function expansion card which is inserted into a computer or in a memory provided in a function expansion unit which is connected to the computer. In this case, the functions according to the above embodiments can be realized by a CPU or the like contained in the function expansion card or unit, which performs part or the entire processes in accordance with designations of the program.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2005-130476 filed on Apr. 27, 2005, which is hereby incorporated by reference herein in its entirety.

What is claimed is:

1. A communication apparatus comprising:
   at least one processor; and
   at least one memory storing code to be executed by the at least one processor, wherein the at least one processor executes the code to function as:
   a search unit to search a partner apparatus to communicate with a wireless communication being compliant with an IEEE 802.11 standard;
   a transmission unit to transmit a first value stored in the communication apparatus to the partner apparatus searched by the search unit;
   a reception unit to receive a second value stored in the partner apparatus from the partner apparatus;
   a determination unit to compare the first value with the second value, determine (i) that the communication apparatus operates as an apparatus for providing a wireless parameter of the wireless communication being compliant with an IEEE 802.11 standard to the partner apparatus if the first value is greater than the second value, and determine (ii) that the communication apparatus operates an apparatus for receiving the wireless parameter of the wireless communication being compliant with an IEEE 802.11 standard from the partner apparatus if the first value is less than the second value; and
   a setting unit configured to set the communication apparatus to operate as the apparatus for providing the wireless parameter of the wireless communication in accordance with a user's instruction,
   wherein in a case that the communication apparatus is set to operate as the apparatus for providing the wireless parameter of the wireless communication by the setting unit, the communication apparatus does not compare the first value with the second value,
   wherein the search unit, the transmission unit and the reception unit communicate through a predetermined frequency channel, and
   wherein the communication apparatus communicates with the partner apparatus based on the wireless parameter through a frequency channel that is selected by the communication apparatus operates as the apparatus for providing the wireless parameter to the partner apparatus.

2. The apparatus according to claim 1, further comprising a console unit that receives the user's instruction from a user.

3. The apparatus according to claim 1, wherein the determination unit determines whether the communication apparatus operates as the apparatus for providing the wireless parameter to the partner apparatus or as the apparatus for receiving the wireless parameter from the partner apparatus, in accordance with information indicating that the partner apparatus is in a state in which the partner apparatus is able to provide the wireless parameter.

4. The apparatus according to claim 1, wherein the determination unit determines whether the communication apparatus operates as the apparatus for providing the wireless parameter to the partner apparatus or as the apparatus for receiving the wireless parameter from the partner apparatus, in accordance with information indicating that the communication apparatus is in a state in which the communication apparatus is able to provide the wireless parameter.

5. The apparatus according to claim 1, wherein the determination unit determines based on the magnitude relation between the second value received by the reception unit and the first value stored in the communication apparatus, in a case that it is not determined whether the communication apparatus operates as the apparatus for providing the wireless parameter to the partner apparatus or the communication apparatus operates as the apparatus for receiving the wireless parameter from the partner apparatus in accordance with a predetermined method.

6. The apparatus according to claim 1, wherein the first and second values are numeric.

7. The apparatus according to claim 1, wherein the wireless parameter includes any one of a network identifier, a frequency channel, an authentication method, an encryption method and an encryption key.

8. The apparatus according to claim 1, wherein the communication apparatus and the partner apparatus include a digital camera or a printer.

9. The apparatus according to claim 1, wherein the predetermined frequency channel is a randomly generated value.

10. The apparatus according to claim 1, wherein the predetermined frequency channel is a fixed value.

11. A control method of a communication apparatus, the method comprising:
    searching a partner apparatus to communicate with a wireless communication being compliant with an IEEE 802.11 standard;
    transmitting a first value stored in the communication apparatus to the partner apparatus searched in the searching;
    receiving a second value stored in the partner apparatus from the partner apparatus;
    comparing the first value with the second value;
    determining (i) that the communication apparatus operates as an apparatus for providing a wireless parameter of the wireless communication being compliant with an IEEE 802.11 standard to the partner apparatus if the first value is greater than the second value, and determining (ii) that the communication apparatus operates an apparatus for receiving the wireless parameter of the wireless communication being compliant with an IEEE 802.11 standard from the partner apparatus if the first value is less than the second value; and
    setting the communication apparatus to operate as the apparatus for providing the wireless parameter of the wireless communication in accordance with a user's instruction,
    wherein in a case that the communication apparatus is set to operate as the apparatus for providing the wireless parameter of the wireless communication by the setting unit, the communication unit does not compare the first value with the second value,
    wherein in the searching, the transmitting and the receiving, communication is performed through a predetermined frequency channel, and
    wherein the communication apparatus communicates with the partner apparatus based on the wireless parameter through a frequency channel that is selected by the communication apparatus operates as the apparatus for providing the wireless parameter to the partner apparatus.

12. The method according to claim 11, wherein the user's instruction is input via a console unit of the communication apparatus.

13. The method according to claim 11, wherein it is determined in the determining whether the communication apparatus operates as the apparatus for providing the wireless parameter to the partner apparatus or as the apparatus for receiving the wireless parameter from the partner apparatus, in accordance with information indicating that the partner apparatus is in a state in which the partner apparatus is able to provide the wireless parameter.

14. The method according to claim 11, wherein it is determined in the determining whether the communication apparatus operates as the apparatus for providing the wireless parameter to the partner apparatus or as the apparatus for receiving the wireless parameter from the partner apparatus, in accordance with information indicating that the communication apparatus is in a state in which the communication apparatus is able to provide the wireless parameter.

15. The method according to claim 11, wherein it is determined in the determining based on the magnitude relation between the second value received in the receiving and the first value stored in the communication apparatus, in a case that it is not determined whether the communication apparatus operates as the apparatus for providing the wireless parameter to the partner apparatus or the communication apparatus operates as the apparatus for receiving the wireless parameter from the partner apparatus in accordance with a predetermined method.

16. The method according to claim 11, wherein the first and second values are numeric.

17. The method according to claim 11, wherein the wireless parameter includes any one of a network identifier, a frequency channel, an authentication method, an encryption method and an encryption key.

18. The method according to claim 11, wherein the communication apparatus and the partner apparatus include a digital camera or a printer.

19. The method according to claim 11, wherein the predetermined frequency channel is a randomly generated value.

20. The method according to claim 11, wherein the predetermined frequency channel is a fixed value.

21. A non-transitory computer-readable storage medium storing a program for causing a computer to function as a communication apparatus comprising:
    a search unit configured to search a partner apparatus to communicate with a wireless communication being compliant with an IEEE 802.11 standard;
    a transmission unit configured to transmit a first value stored in the communication apparatus to the partner apparatus searched by the search unit;
    a reception unit configured to receive a second value stored in the partner apparatus from the partner apparatus;
    a determination unit configured to compare the first value with the second value, and determine (i) that the communication apparatus operates as an apparatus for providing a wireless parameter of the wireless communication being compliant with an IEEE 802.11 standard to the partner apparatus if the first value is greater than the second value, and determine (ii) that the communication apparatus operates an apparatus for receiving the wireless parameter of the wireless communication being compliant with an IEEE 802.11 standard from the partner apparatus if the first value is less than the second value; and
    a setting unit configured to set the communication apparatus to operate as the apparatus for providing the wireless parameter of the wireless communication in accordance with a user's instruction,
    wherein in a case that the communication apparatus is set to operate as the apparatus for providing the wireless parameter of the wireless communication by the setting unit, the communication unit does not compare the first value with the second value,
    wherein the search unit, the transmission unit and the reception unit communicate through a predetermined frequency channel, and
    wherein the communication apparatus communicates with the partner apparatus based on the wireless parameter through a frequency channel that is selected by the communication apparatus operates as the apparatus for providing the wireless parameter to the partner apparatus.

* * * * *